UNITED STATES PATENT OFFICE.

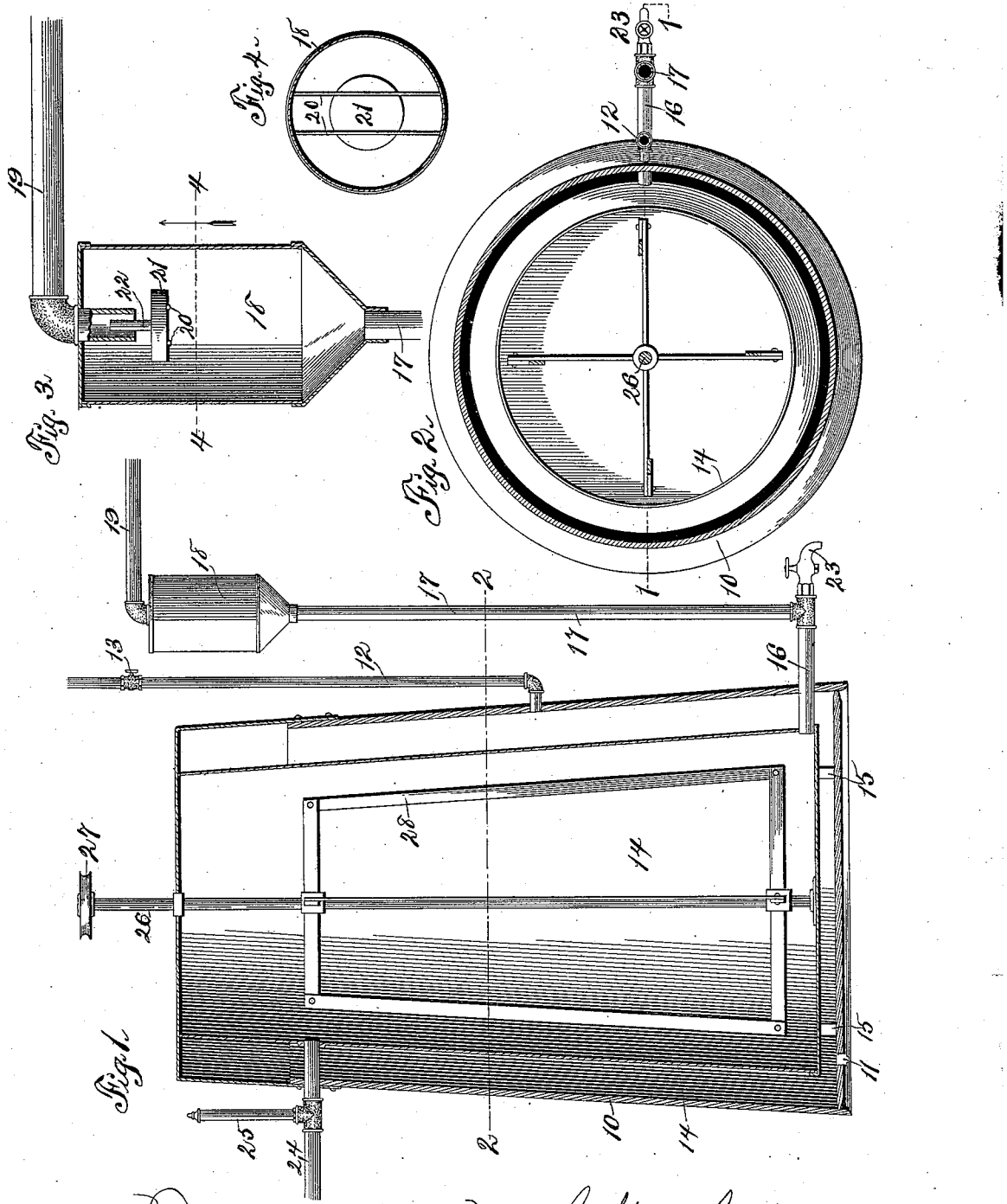

JULIUS ANDERSEN, OF KIMBALLTON, IOWA.

MILK-HEATER.

SPECIFICATION forming part of Letters Patent No. 575,499, dated January 19, 1897.

Application filed January 13, 1896. Serial No. 575,207. (No model.)

*To all whom it may concern:*

Be it known that I, JULIUS ANDERSEN, a citizen of Denmark, residing at Kimballton, in the county of Audubon and State of Iowa, have invented a new and useful Apparatus for Heating Milk and Conveying it to a Cream-Separator, of which the following is a specification.

The object of my invention is to provide means for heating a quantity of milk which is to be separated in advance of the introduction of said milk into the separating-machine, in order that the temperature of all the milk when it enters the separator may be the same.

My invention consists in the combination of a milk-receptacle, a casing inclosing said receptacle and arranged to contain steam, means for introducing steam to the casing, means for introducing milk to the receptacle, an agitator within the receptacle, and a discharge-pipe leading to a separator, to which discharge-pipe a lactometer is attached.

My invention consists, further, in the construction, arrangement, and combination of elements hereinafter set forth, pointed out in my claim, and illustrated by the accompanying drawings, in which—

Figure 1 is a sectional elevation illustrating my entire apparatus. Fig. 2 is a sectional plan on the indicated line 2 2 of Fig. 1. Fig. 3 is a sectional elevation of a funnel through which the milk is fed to the heating-receptacle. Fig. 4 is an inverted sectional plan of the funnel on the indicated line 4 4 of Fig. 3.

In the construction of the apparatus as shown the numeral 10 designates a casing which may be made of wood and provided with a sheet-metal cap or top and a plug or bung 11 in its bottom. A steam-pipe 12 leads from a steam-boiler (not shown) to and enters one side of the casing 10, which steam-pipe is provided with a stop-valve 13, whereby the flow of steam therethrough may be regulated or cut off. A receptacle 14, of sheet metal, is mounted within the casing 10, which receptacle is slightly shorter and of less diameter than the said casing. The receptacle 14 rests upon lugs or blocks 15 on the bottom of the casing, and the sides thereof are fixed and sealed to the top of said casing. The receptacle 14 is mounted concentrically within the casing, thus providing a chamber for steam around and below said receptacle. An ingress-pipe for the milk is provided and comprises a horizontal section 16, transversely positioned in the lower portions of the casing and receptacle and communicating with said receptacle, and a vertical portion 17, rising from the outer end of the section 16. A funnel 18 is mounted on and communicates with the upper end portion of the pipe-section 17. The funnel 18 is inclosed and air-tight except for the inlet and outlet thereto, and the outlet is provided by the pipe-section 17. The inlet to the funnel is provided for in a pipe 19, which leads from a source of milk-supply and extends within and below the top of said funnel. Rods 20 20 are transversely positioned in the funnel 18 and support at times a float 21, which float is provided with a stem 22, rising within the lower end portion of the inlet-pipe 19. The outer end portion of the section 16 of the ingress-pipe is provided with a faucet 23, by means of which the receptacle may be drained. The overflow or discharge pipe 24 is horizontally positioned in the upper portions of the casing 10 and receptacle 14 and communicates with the receptacle, which pipe leads to the separator. (Not shown.) A lactometer 25 is mounted on the pipe 24 and communicates therewith. A shaft 26 is vertically positioned and stepped in the receptacle 14 and extends through the top to the receptacle and casing. A belt-wheel 27 is mounted on the upper end of the shaft 26, whereby the power may be applied to rotate said shaft. Dasher fans or blades 28 are fixed to the shaft 26 within the receptacle and extend nearly the entire height thereof.

In the practical use of my invention the milk flows through the pipe 19, funnel 18, and pipes 17 16 into the receptacle and fills said receptacle approximately full, at which time the float 21 rises and shuts off the further flow of milk into the funnel. Steam is introduced to the casing and the agitator is rotated slowly to keep up a circulation of the milk in the receptacle without churning the same until the milk is heated to the desired degree, at which time it flows off through the pipe 24 to the separator. When the desired quantity of milk has been passed to the separator, the residue is withdrawn from the heater by the faucet 23.

I claim as my invention—

An apparatus for heating and conveying milk comprising a casing, means for feeding steam to said casing, a receptacle for milk located within said casing, a milk-ingress pipe 16 communicating with the lower portion of the milk-receptacle and extended through and out of the steam-casing, a down-pipe 17 communicating with the outer end portion of the pipe 16, a milk-reservoir mounted on and communicating with the upper end of the pipe 17 independent of the separator, an ingress-pipe 19 leading to said reservoir, a float-valve arranged to close the communication between the ingress-pipe 19 and the reservoir, rods positioned transversely of the reservoir to limit the descent of the float-valve, an overflow-pipe 24 leading from the upper portion of the milk-receptacle through and out of the steam-casing, an agitator vertically positioned in the milk-receptacle and means for operating said agitator.

JULIUS ANDERSEN.

Witnesses:
O. H. JACOBSON,
E. P. SIMONSEN.